(12) United States Patent
Schallert et al.

(10) Patent No.: US 12,222,004 B2
(45) Date of Patent: Feb. 11, 2025

(54) BEARING CUP SET FOR A STEERING COLUMN AND STEERING COLUMN HAVING A BEARING CUP SET

(71) Applicants: thyssenkrupp Presta AG, Eschen (LI); thyssenkrupp AG, Essen (DE)

(72) Inventors: Lucas Schallert, Hoechst (AT); Hansjoerg Sulser, Gamprin (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 120 days.

(21) Appl. No.: 18/118,608

(22) Filed: Mar. 7, 2023

(65) Prior Publication Data

US 2023/0287934 A1   Sep. 14, 2023

(30) Foreign Application Priority Data

Mar. 9, 2022 (DE) .................. 10 2022 202 357.9
Nov. 8, 2022 (DE) .................. 10 2022 211 798.0

(51) Int. Cl.

| F16C 19/16 | (2006.01) |
|---|---|
| B62D 1/16 | (2006.01) |
| F16C 27/06 | (2006.01) |
| F16C 33/58 | (2006.01) |
| F16C 35/077 | (2006.01) |

(52) U.S. Cl.
CPC .............. *F16C 33/583* (2013.01); *B62D 1/16* (2013.01); *F16C 19/166* (2013.01); *F16C 27/066* (2013.01); *F16C 33/588* (2013.01); *F16C 35/077* (2013.01); *F16C 2326/24* (2013.01)

(58) Field of Classification Search
CPC ........ F16C 19/166; F16C 25/08; F16C 27/04; F16C 33/583; F16C 33/588; F16C 33/61; F16C 35/063; F16C 35/077; F16C 2326/24; B62D 1/16
See application file for complete search history.

(56) References Cited

U.S. PATENT DOCUMENTS 1,420,497 A * 6/1922 Page .................. F16C 33/588
                                                    384/584
2008/0025655 A1   1/2008 Creviston et al.

FOREIGN PATENT DOCUMENTS

| DE | 19951388 A1 | 5/2001 |
|---|---|---|
| DE | 102018122375 A1 | 3/2020 |
| DE | 102021203356 A1 | 7/2021 |

(Continued)

*Primary Examiner* — Phillip A Johnson
(74) *Attorney, Agent, or Firm* — thyssenkrupp North America, LLC

(57) ABSTRACT

The present invention relates to a bearing cup set for a steering column comprising a bearing cup and a securing element, wherein the bearing cup has a bearing cup portion for the at least partial receiving of a rolling bearing and a holding portion extending radially outwards starting from the bearing cup portion. The bearing cup portion has a first opening side with a collar extending radially inwards and a second opening side. The securing element is connected to the bearing cup in such a manner that the securing element fixes a rolling bearing received by the bearing cup portion in the axial direction in respect of the bearing cup. A steering column comprises a jacket tube in which a steering shaft is received by the rolling bearing so as to be rotatable. The rolling bearing is arranged in the bearing cup portion of the bearing cup.

14 Claims, 3 Drawing Sheets

(56) References Cited

FOREIGN PATENT DOCUMENTS

FR 2824878 A1 11/2002
FR 2874980 A1 * 3/2006 ............ F16C 35/045

* cited by examiner

BEARING CUP SET FOR A STEERING COLUMN AND STEERING COLUMN HAVING A BEARING CUP SET

CROSS REFERENCE TO RELATED APPLICATION

This application is a U.S. Non-Provisional that claims priority to German Patent Application No. DE 10 2022 202 357.9, filed Mar. 9, 2022, and German Patent Application No. DE 10 2022 211 798.0, filed Nov. 8, 2022, the entire content of which is incorporated herein by reference.

FIELD

The present disclosure generally relates to a bearing cup set for a steering column having a bearing cup.

BACKGROUND

Intermediate components which can be arranged between a bearing, which supports a steering shaft, and a jacket tube are known in the prior art. DE 199 51 388 A1 describes a tolerance ring, for example, which can be arranged in a steering column bearing. This tolerance ring comprises a holding projection, an opening for feeding through a shaft and a wall portion, wherein the wall portion encloses an outer side of a bearing received by the tolerance front. The tolerance ring has two holding lugs on the wall portion, which are supported on the outer ring of the bearing in a sprung manner when the tolerance ring is pushed into a bearing module, so that a resetting force which is directed radially outwards acts on the respective holding lug. In addition, a bearing retainer is known from US 2008/0025655 A1, wherein a wall portion of the bearing retainer surrounds a bearing that has been introduced on the outer side thereof. When the bearing is inserted into the bearing holder, the wall in contact with the bearing becomes deformed, in order to secure the bearing within the bearing holder. In addition, a holding portion which is elastically yielding and becomes deformed when the bearing holder is inserted into a cavity, so that said bearing holder is secured in said cavity, also extends from the wall portion.

Moreover, DE 10 2021 203 356 A1 describes a bearing cup for a steering column, wherein the bearing cup comprises a base portion with an opening for feeding through a shaft and a wall portion. The bearing cup in this case is designed to receive a rolling bearing in such a manner that the wall portion encloses an outer element of a received rolling bearing at least partially, and the base portion of the bearing cup covers one side of a received rolling bearing at least partially.

The bearing cup further comprises a holding portion which extends radially outwards from the wall portion, wherein the holding portion is designed to be supported against an inner wall of a tube, in order for the bearing cup to be arranged in a tube.

Thus, a need exists to provide an improved possibility for disposing a bearing in a tube, in particular for a rolling bearing in a jacket tube of a steering column. To be advantageously achieved in the process are easy assembling and simple installing in a jacket tube of a steering column, and a reliable disposal of the bearing is to be achieved.

BRIEF DESCRIPTION OF THE FIGURES

FIG. 5 is a sectional representation of a further exemplary embodiment of a bearing cup set designed according to the invention with the bearing cup and securing element connected and the rolling bearing pressed in.

DETAILED DESCRIPTION

Figure 1:
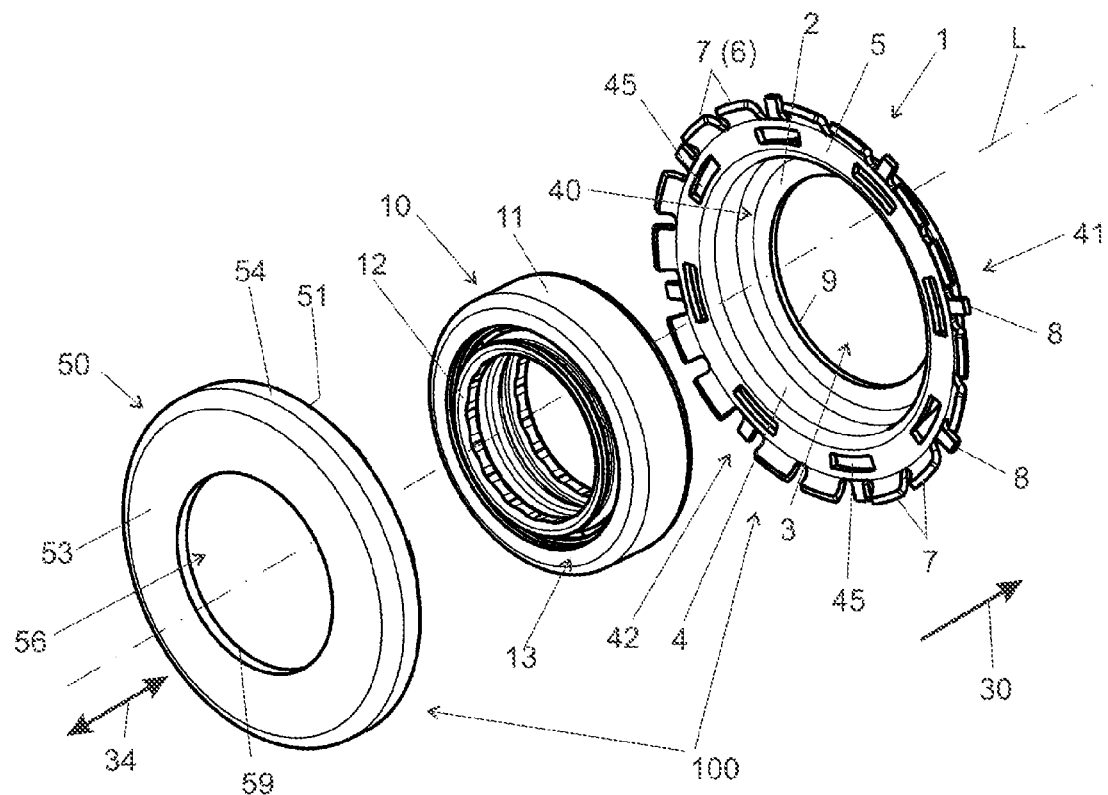
FIG. 1 is a perspective view of an exemplary embodiment of a bearing cup set designed according to the invention and a rolling bearing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a bearing cup set for a steering column having a bearing cup. The bearing cup has a bearing cup portion for receiving a rolling bearing and a holding portion extending radially outwards starting from the bearing cup portion. The bearing cup portion has a first opening side with a collar extending radially inwards and a second opening side. In addition, the invention relates to a steering column for a motor vehicle having a jacket tube and a steering shaft. The steering shaft is supported by a rolling bearing and arranged so as to be rotatable within the jacket tube.

A bearing cup set and a steering column according to the independent claims are proposed. Further advantageous embodiments of the invention are described in the dependent claims and the description and represented in the figures.

The proposed solution envisages a bearing cup set for a steering column comprising a bearing cup and a securing element, wherein the bearing cup has a bearing cup portion for the at least partial receiving of a rolling bearing and a holding portion extending radially outwards starting from the bearing cup portion, wherein the bearing cup portion has a first opening side with a collar extending radially inwards and a second opening side, and wherein the securing element is connected to the bearing cup in particular in such a manner that the securing element fixes a rolling bearing received by the bearing cup portion in the axial direction in respect of the bearing cup. The bearing cup set advantageously has connection means, in order to connect the securing element to the bearing cup at the second opening side of the bearing cup portion.

The proposed solution further envisages a bearing cup set for a steering column comprising a bearing cup and a securing element, wherein the bearing cup has a bearing cup portion for the at least partial receiving of a rolling bearing and a holding portion extending radially outwards starting from the bearing cup portion, wherein the bearing cup portion has a first opening side with a collar extending radially inwards and a second opening side, and wherein the bearing cup set has connection means, in order to connect the securing element to the bearing cup at the second opening side of the bearing cup portion, in particular in such a manner that the securing element connected to the bearing cup is designed to fix a rolling bearing received by the bearing cup portion in the axial direction in respect of the bearing cup.

If a bearing is received by the bearing cup, in particular pressed into the bearing cup portion, and the securing element is connected to the bearing cup, the securing element connected to the bearing cup advantageously prevents the bearing from being able to fall out of the bearing cup portion or from being able to be displaced in relation to the bearing cup portion. The design of the bearing cup itself advantageously allows easy introduction into a tube, in particular into the jacket tube of a steering column. The holding portion is advantageously designed to be supported against an inner wall of a tube, in order for the bearing cup to be arranged in a tube, and it may, in particular, be designed as a holding ring. By adapting the holding portion of the bearing cup, an identical rolling bearing may advantageously be inserted into different tubes, which may in particular have different internal tube diameters. Further advantageously, the holding portion offers a sufficiently rigid support.

The bearing cup portion of the bearing cup has, in particular, a base portion with an opening for feeding through a shaft and a wall portion, wherein the base portion is advantageously formed by the collar which extends radially inwards of the bearing cup portion. The bearing cup in this case is advantageously designed to receive a rolling bearing, in such a manner that the wall portion at least partially encloses an outer element of a received rolling bearing, which surrounds the rolling bearing in a particularly ring-shaped manner, and the base portion of the bearing cup at least partially covers one side of a rolling bearing which is received. In particular, it is provided that the wall portion is designed in the form of a cylinder casing. The embodiment of the bearing cup enables a rolling bearing to be advantageously easily inserted, in particular pressed, into the receiving region formed from the base portion and the wall portion. In particular, the bearing cup and the securing element are differently configured. In particular, the bearing cup and the securing element do not have a symmetrical design. In particular, the securing element and the bearing cup have different geometries. More particularly, the securing element does not have a holding portion. In the case of a bearing cup set introduced into a tube, the bearing cup set in this case is advantageously only supported against an inner wall of the tube by the holding portion of the bearing cup and advantageously not by the securing element. The outer dimensions of the securing element, in particular the diameter of the securing element, are advantageously smaller in the radial direction than in the case of the bearing cup.

Advantageously, the securing element also has a base portion with an opening for feeding through a shaft and also a wall portion, wherein the base portion is advantageously formed by a radially inwardly extending collar. The securing element is advantageously designed to fix a rolling bearing received by the bearing cup, in such a manner that the wall portion of the securing element partially encloses an outer element of a rolling bearing that has been received, which outer element particularly surrounds the rolling bearing in a ring-shaped manner, and the base portion of the securing element at least partially covers the side of the rolling bearing which is not received by the bearing cup. In particular, it is provided that the wall portion is designed in the form of a cylinder casing. The wall portion advantageously also has a connection portion via which the securing element can be connected to the bearing cup. In particular, it is provided that the securing element has a ring-shaped contour. In particular, the securing element may be designed in the manner of a cover for the bearing cup.

According to an advantageous development of the bearing cup set, the securing element has form-fitting elements and the bearing cup has form-fitting recesses as the connection means of the bearing cup set. The form-fitting elements in this case advantageously engage with the form-fitting recesses, when the securing element is connected to the bearing cup.

In an advantageous development, it may be provided that the form-fitting elements are provided by means of a reforming operation, for example by means of wobble riveting, caulking or ultrasound welding. Consequently, the reforming operation is advantageously carried out following the positioning of the securing element in relation to the bearing cup and the form-fitting elements are consequently formed.

Alternatively or in addition, it may be provided that the bearing cup has form-fitting elements and the securing element has form-fitting recesses as the connection means of the bearing cup set, wherein the form-fitting elements also advantageously engage with the form-fitting recesses in this case, when the securing element is connected to the bearing cup. The form-fitting elements and the form-fitting recesses advantageously allow a fixed connection between the bearing cup and securing element, so that a bearing received by the bearing cap is advantageously prevented from being able to fall out of the bearing cup portion or to be displaced in respect of the bearing cup portion even more effectively. Further advantageously, the form-fitting elements and the form-fitting recesses are designed in such a manner that the bearing head and the securing element can be separated from one another again in a nondestructive manner, preferably without the use of tools.

It is particularly advantageous, especially when it comes to making assembly even simpler, for the securing element to be able to be clipped to the bearing cup. A further advantageous embodiment of the bearing cup set provides that the form-fitting elements are designed as latching lugs, in particular as resilient latching lugs, and the form-fitting recesses are designed as receiving slots for the latching lugs.

In particular, it is provided that the holding portion of the bearing cup comprises the connection means of the bearing cup. In particular, it is provided that the holding portion has the form-fitting recesses, in particular distributed at equidistant intervals over the holding portion.

Further advantageously, the securing element has a connection portion, wherein the connection portion advantageously has the connection means of the securing element, in particular the form-fitting elements. The form-fitting elements in this case are advantageously arranged on the holding portion in a manner corresponding to the form-fitting recesses.

A further advantageous embodiment envisages that the securing element has a receiving portion for the partial receiving of a rolling bearing, in particular in such a manner that a rolling bearing received by the bearing cup set is completely received by the bearing cup and the securing element connected to the bearing cup and is fixed by the securing element in the axial direction in respect of the bearing cup. In this way, the securing element may advantageously also help to protect the rolling bearing from foreign bodies and contaminants.

According to a further advantageous embodiment, it is provided that the bearing cup is a one-piece, integral component and the bearing cup is advantageously made of a metallic material. In this case, the configuration as a one-piece, integral component advantageously makes handling of the bearing cup easier. If the bearing cup is made of a metal material, the bearing cup is advantageously durable and advantageously suitable for absorbing relatively large forces without suffering any damage. The bearing cup is advantageously made of a lightweight metal, in particular aluminum. The bearing cup may, in particular, also be made of steel or sheet metal. In particular, it is provided that the bearing cup is a deep-drawn punched component. As a result of this, the bearing cup can advantageously be produced cost-effectively.

The securing element, on the other hand, is advantageously made of plastic and to this extent is advantageously favorable in production terms. The securing element is advantageously also a one-piece, integral component. In particular, the securing element may be an injection-molded part. Particularly when the bearing cup is made of a metal material and is made of plastic, it is advantageous for the bearing cup to have the form-fitting recesses, in particular slots, and the securing element the form-fitting elements, in particular latching lugs, as connection means. This is because, on the one hand, weight advantages result from this embodiment. In addition, the latching lugs can be directly formed in a resilient manner from plastic.

In an advantageous development it is provided that the securing element and the bearing cup are designed as a one-piece component. This component is preferably formed in the holding portion or in the wall portion and comprises at least one holding tongue which protrudes inwardly. The at least one holding tongue in this case advantageously forms the pull-out securing means for the rolling bearing, so that said rolling bearing cannot be removed from the bearing cup again after it has been pressed in without requiring greater force. The at least one holding tongue advantageously has a resilient design. The at least one holding tongue is advantageously tilted against the fitting direction. In this way, the at least one holding tongue is wedged in a rolling bearing inserted in the bearing cup advantageously with the outer lateral surface of the outer ring (outer element) of the rolling bearing, when the rolling bearing is exposed to a force against the fitting direction in the bearing cup. As a result of this, a fixed and reliable seat of the rolling bearing in a bearing cup is advantageously achieved. According to an advantageous embodiment, the securing element and the bearing cup are therefore together designed according to an advantageous embodiment as a single, one-piece component, wherein the securing element is advantageously designed in the holding portion or in the wall portion of the bearing cup, in particular as a plurality of holding tongues which are preferably oriented radially inwards and, more advantageously, in the direction of the first opening side of the bearing cup.

According to an advantageous embodiment, it is provided that the holding portion of the bearing cup comprises a pull-out securing means. This pull-out securing means advantageously prevents a movement of the bearing cup, which has been introduced into a tube in a fitting direction, against said fitting direction. The fitting direction is the direction in which the bearing head is introduced into a tube. In particular, it is provided that the outer contour of the holding portion forms the pull-out securing means. The holding portion of the bearing cup advantageously comprises at least one holding tongue, in particular multiple holding tongues. The at least one holding tongue in this case advantageously forms the pull-out securing means. The at least one holding tongue advantageously has a resilient design. The at least one holding tongue is advantageously tilted against the fitting direction. As a result of this, the at least one holding tongue of a bearing cup inserted into a tube is advantageously wedged with an inner tube wall of the tube, when the bearing cup is exposed to a force against the fitting direction in the tube. In this way, a fixed and reliable fit of the bearing cup in a tube is advantageously achieved.

According to a further advantageous embodiment of the invention, the holding portion of the bearing cup has stabilizing elements at its outer end which point radially outwards. The stabilizing elements are advantageously designed to receive forces acting radially on the bearing cup arranged in a tube. In this way, the supporting action in the radial direction is advantageously further improved. In particular, it is provided that the holding portion comprises at least three stabilizing elements. The stabilizing elements are advantageously tilted against the fitting direction, but preferably tilted less sharply than the holding tongues. In particular, it may also be provided that the stabilizing elements are not tilted and, in particular, lie completely in the plane spanned by the holding portion.

The stabilizing elements and the holding tongues of the holder portion are advantageously arranged in alternation, in particular in regular alternation. In particular, the number of holding tongues in this case may exceed the number of stabilizing elements. In particular, a ratio of holding tongues to stabilizing elements may be greater than 1:1, in particular greater than 1.4:1, in particular 2:1 or greater than 2:1.

In accordance with a particularly advantageous embodiment of the invention, the bearing cup comprises a rolling bearing damping limiter. As a result of this, damping provided by a rolling bearing introduced into the bearing cup is advantageously limited. It is particularly important for the bearing to have a good damping action in steering systems, so that shocks on a steering column can be dampened. However, good responsiveness on the part of this damping action is regularly associated with a relatively long damping path. A long damping path may, however, result in a steering shaft having a greater deflection than desired. With the rolling bearing damping limiter provided by the bearing cup, the damping path is advantageously reduced and an excessive deflection of a steering shaft can therefore be advantageously prevented.

Further advantageously, the bearing cup comprises a shoulder which is designed to create a distance from a predefined counter-shoulder, which may be formed by a steering shaft or an inner ring of a rolling bearing, and to limit a deflection of a steering shaft. In particular, the shoulder of the bearing cap may also be formed by the radially inwardly extending collar of the bearing cap portion. The bearing cap in this case is advantageously designed in such a manner that in this case of a rolling bearing arranged on a shaft and received by the bearing cup in the no-load state, a distance between the collar and a contact surface facing the collar is formed. This distance is advantageously smaller than the maximum possible damping path of a received rolling bearing. In this way, a rolling bearing damping limit is advantageously provided, which advantageously prevents excessive deflection of a steering shaft.

In order to use the bearing cup set, it is particularly provided that a bearing is mounted in the bearing cup at a preassembly stage, wherein the bearing is received by the bearing cup portion. The bearing cup portion in this case must be of such dimensions, however, that the bearing is completely enclosed by the bearing cup portion. It may be provided that the bearing is pressed into the bearing cup portion. Once the bearing has been mounted in the bearing cup, the bearing cup and the securing element are connected to one another, in particular in such a manner that the securing element is clipped into the holding portion of the bearing cup which is designed as a holding ring. The holding ring has, in particular, corresponding recesses for this purpose and the securing element has corresponding lugs, so that the lugs can engage with the recesses and advantageously form an undercut after fitting. In this way, the securing element is advantageously fixedly connected to the bearing cup. As soon as a press-out force is achieved between the bearing and the holding portion, the securing element advantageously takes over the remaining forces and ensures that the requirements are met. In other words, that once a maximum holding force has been reached between the holding portion of the bearing cup and bearing, the securing element is advantageously designed to take over the remaining forces which are required.

The steering column further proposed in order to solve the problem referred to above comprises a jacket tube, in which a steering shaft is received in a rotatably mounted manner by a rolling bearing, wherein the rolling bearing is arranged in a bearing cup portion of a bearing cup and the bearing cup is supported with a holding portion against an inner wall of the jacket tube, wherein a securing element is connected to the bearing cup, in particular such that the rolling bearing is fixed in the axial direction in respect of the bearing cup. In particular, it is provided that the bearing cup and the securing element are a bearing cup set designed according to the invention. To this extent, the bearing cup and the securing element have, in particular, the previously described features, either individually or in combination.

According to an advantageous embodiment of the steering column, the bearing cup comprises a shoulder which is at a defined distance from a counter-shoulder formed by the steering shaft or an inner ring of the rolling bearing, wherein the shoulder is designed with the defined spacing to restrict a deflection of the loaded steering shaft. This is particularly the case when a steering wheel lock is secured and a high torque is introduced into the steering shaft. By limiting the deflection, the locking bolt can advantageously be prevented from jumping over out of the locking bolt receiving groove of the steering shaft or the latching star wheel mounted on the steering shaft.

An advantageous embodiment further envisages that the rolling bearing of the proposed steering column comprises a rolling body, an inner ring, an outer element and at least one shock-absorbing element. The outer element which surrounds the rolling bearing, particularly as the external ring, in particular as the outer ring, is advantageously fixed by the bearing cup in this case and positioned in an axial direction by the securing element in respect of the bearing cup. The bearing cup geometry of the holding ring advantageously provides radial support for the inner ring of the rolling bearing. The rolling bearing is advantageously designed in such a manner that when force is applied, the inner ring can perform a damping movement in the radial direction relative to the outer element, wherein the damping movement is restricted by a rolling bearing damping limit provided by means of the bearing cup. In particular, it is provided in this case that a contact surface lies at a distance opposite the collar of the bearing cup in when there is no load, wherein the collar forms a shoulder, against which the contact surface can rest as a counter-shoulder when a load is applied. The counter-shoulder is advantageously formed by a steering shaft portion of the steering shaft. According to an advantageous embodiment variant in this respect, the counter-shoulder is formed by a part of the inner ring of the rolling bearing. The inner ring of the rolling bearing advantageously projects beyond the outer element of the rolling bearing, at least on the side facing the base portion of the bearing cup with an inner ring portion, in particularly laterally, wherein the counter-shoulder is formed by the inner ring portion. The inner ring portion in this case is advantageously turned, in particular bent, towards the collar of the bearing cup. The distance between the shoulder formed by the collar and the counter-shoulder formed by the steering shaft portion or the part of the inner ring means that a damping movement of the rolling bearing is allowed, but advantageously only until the shoulder and the counter-shoulder come into contact. The damping path provided by the rolling bearing is therefore advantageously limited and a deflection of the steering shaft of the steering column is therefore also advantageously restricted. In particular, when a steering shaft comprising a locking bolt receiving groove or a latching star wheel is secured using a steering wheel lock, by limiting the deflection of the steering shaft the locking bolt can be prevented from jumping over out of the locking bolt receiving groove of the steering shaft or the latching star wheel mounted on the steering shaft can be prevented from jumping over.

In particular, it is provided that the distance existing between the shoulder formed by the collar and the counter-shoulder formed by the steering shaft portion or the part of the inner ring is smaller than the vertical distance starting from the center point of one of the rolling bodies to the inner diameter of a shock-absorbing element which, particularly as a rubber ring, supports outer rings of the rolling bearing. It has proved advantageous in this case, on the one hand, for a sufficient damping action to be achieved and, on the other hand, for a deflection of the steering shaft to be adequately prevented.

A further advantageous embodiment of the steering column envisages that the steering shaft has a latching star wheel with a plurality of points to interact with a steering wheel lock, wherein the distance, so in particular the distance between the shoulder formed by the collar and the counter-shoulder formed by the steering shaft portion or the part of the inner ring, is designed to be smaller than the height of the points of the latching star wheel.

Using the proposed steering column a method can advantageously be achieved for preventing a locking bolt from jumping over out of a locking bolt receiving groove in a steering shaft secured using a steering wheel lock or for preventing a latching star wheel which is arranged on a steering shaft from jumping over, said latching star wheel being engaged with a fixing element of a steering wheel lock. In particular, a method for preventing a locking bolt from jumping over out of a locking bolt receiving groove of a steering shaft secured using a steering wheel lock, or for preventing a latching star wheel mounted on a steering shaft secured using with a steering wheel lock from jumping over when a torque is applied to the steering shaft is therefore also proposed, wherein the steering shaft is mounted in a rolling bearing with an inner ring and an outer element which particularly surrounds the rolling bearing in a ring-shaped manner, wherein the rolling bearing is arranged in a bearing cup which is connected to a securing element in a jacket tube. The bearing cup and the securing element in this case are advantageously designed as a bearing cup set according to the invention. When the rolling bearing is arranged in the bearing cup, the outer element of the rolling bearing is fixed relative to the jacket tube by the bearing cup and the rolling bearing is positioned by the securing element in the axial direction in relation to the bearing cup. On account of the torque which is applied, the steering shaft displaces the inner ring radially relative to the outer element, wherein the displacement is limited by the fact that a shoulder of the bearing cup, in particular the shoulder formed by the collar of the bearing cup, is in contact with a counter-shoulder which lies opposite the shoulder and is formed by a contact surface, in particular before an over-jump can take place. The counter-shoulder in this case is advantageously formed by a steering shaft portion or a part of the inner ring of the rolling bearing.

In the different figures, the same parts are usually provided with the same reference numbers and are therefore also each only explained in connection with one of the figures.

Figure 2:
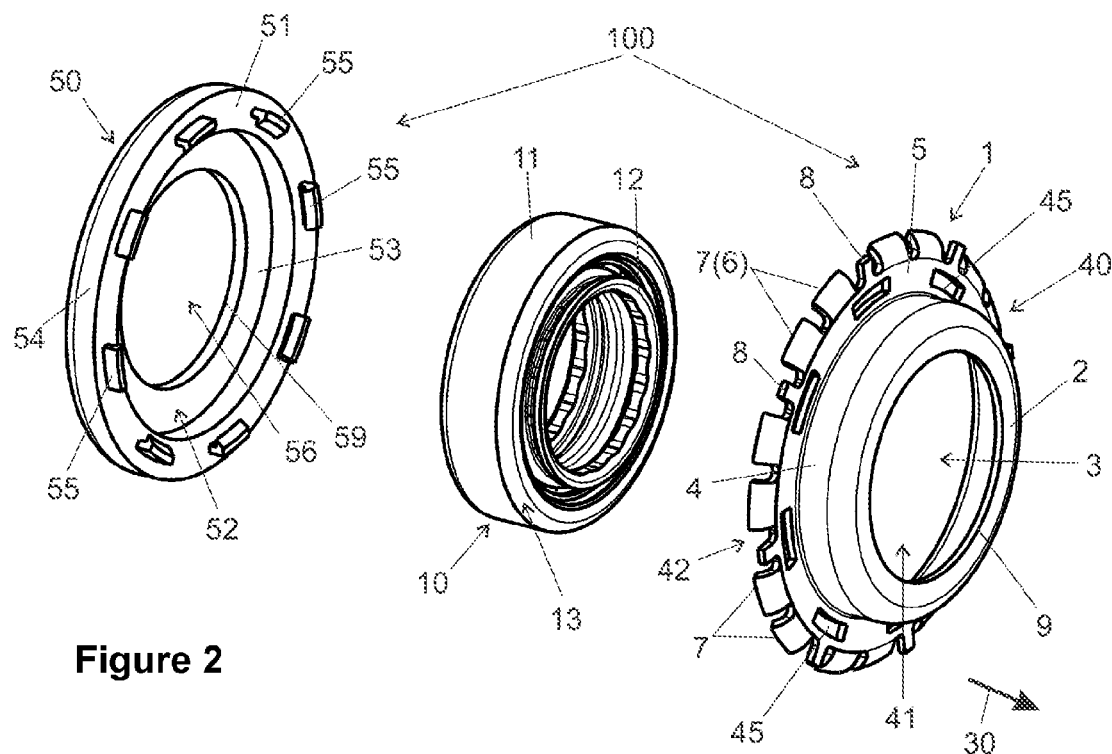
FIG. 2 is a further perspective view and the rolling bearing according to FIG. 1.

An exemplary embodiment for a bearing cup set 100 designed according to the invention, which comprises a bearing cup 1 and a securing element 50, and a rolling bearing 10 are depicted as a perspective representation in FIG. 1. FIG. 2 shows the same exemplary embodiment turned to a different perspective. The bearing cup 1 and the securing element 50 in this exemplary embodiment have a rotationally symmetrical structure in relation to the axis L. The bearing cup 1 in this exemplary embodiment is a one-piece, integral component made of a metal material and the securing element 50 is a one-piece, integral component made of a plastic.

The bearing cup 1 comprises a bearing cup portion 40 which is designed to receive the rolling bearing 10, wherein the rolling bearing 10 need not be completely received by the bearing cup portion 40 in this case. The bearing cup 1 has a holding portion 5 which extends radially outwards starting from the bearing cup portion 40. The bearing cup portion 40 also has a first opening side 41 and a second opening side 42, wherein the bearing cup portion 40 has a wall portion 4 between the first opening side 41 and the second opening side 42, which wall portion is designed as a lateral surface of a cylinder in this exemplary embodiment. At the first opening side 41, the bearing cup 1 comprises a collar 9 which extends radially inwards, wherein a base portion 2, in particular, is formed by the collar 9. In this case, the base portion 2 and the wall portion 4 of the bearing cup 1 form a receiving region for the rolling bearing 10. The base portion 2 may, in particular, have a planar design, although, as shown in FIG. 1 and FIG. 2, it may also be non-planar, particularly at the transition with the wall portion 4, and particularly exhibit a curvature. In addition, the base portion 2 of the bearing cup 1 comprises an opening 3 on the first opening side 41, through which a shaft can be fed. In the holding portion 5 of the bearing cup 1, the bearing cup 1 has form-fitting recesses 45 designed as receiving slots, which are introduced into the holding portion 5 in an equally distributed manner along a circular path.

The securing element 50 has a receiving portion 52 which is formed by a base portion 53 with an opening 56 for feeding through a shaft and by a wall portion 54. The wall portion 54 is designed as a cylindrical lateral surface starting from the outer end of the base portion 53. The wall portion 54 of the securing element 50 in this exemplary embodiment has a thinner design than the wall portion 4 of the bearing cup 1. In particular, the wall portion 54 of the securing element 50 may be half as wide as the wall portion 4 of the bearing cup 1. In particular, the securing element 50 comprises a collar 59 which extends radially inwards. On the side of the securing element 50 facing away from the collar 59, the securing element 50 has a connection portion 51 with form-fitting elements 55 designed as latching lugs which are evenly distributed on the connection portion 51 corresponding to the form-fitting recesses 45.

Figure 5:
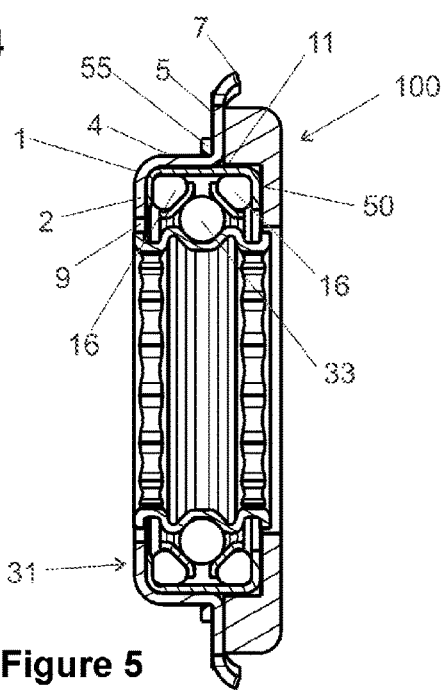

The bearing cup 1, the securing element 50 and the rolling bearing 10 are coordinated with one another in the exemplary embodiment shown in FIG. 1 and FIG. 2 in such a manner that the rolling bearing 10 can be pressed into the receiving region of the bearing cup 1. When the rolling bearing 10 is pressed into the receiving region, in other words is arranged in the bearing cup 1, the wall portion 4 partially encloses an outer element 11 surrounding the rolling bearing 10 on the outside, wherein the outer element 11, as shown in FIG. 1 and FIG. 2, can be designed as a ring-shaped sleeve. The base portion 2 of the bearing cup 1 in this case partially covers one side 13 of the two sides of the rolling bearing 10. The securing element 50 is then connected to the bearing cup 1 on the second opening side 42 of the bearing cup portion 40, namely in such a manner that the form-fitting elements 55 of the securing element 50 are introduced into the form-fitting recesses 45 of the bearing cup 1. Since the form-fitting elements 55 designed as latching lugs have a resilient design, said form-fitting elements 55 are pressed slightly outwards when they are fitted into the form-fitting recesses 45 and then form an undercut, and therefore a means of securing to prevent loss, once they have been completed fitted. The securing element 50 and the bearing cup 1 are then fixedly connected to one another, wherein the rolling bearing 10 received by the bearing cup portion 40 is fixed in an axial direction 34 in respect of the bearing cup 1 by the securing element 50. The wall portion 54 of the securing element 50 connected to the bearing cup 1 partially surrounds the outer element 11 of the rolling bearing 10 which is received in this case. The base portion 53 of the securing element 50 further partially covers the side 13 of the rolling bearing 10 which is not received by the bearing cup 1. A bearing cup set 100 comprising a rolling bearing 10 connected to one another in this way is shown in FIG. 5.

The bearing cup 1 of the bearing cup set 100 in this case may be arranged with the connected securing element 50 and the received rolling bearing 10 in a tube, in particular in a jacket tube of a steering column. The holding portion 5 in this case advantageously forms a diameter enlargement for the rolling bearing 10, so that via the embodiment of the holding portion 5, the rolling bearing 10 can be inserted into tubes with different internal diameters. With the holding portion 5, the bearing cup 1 or the bearing cup set 100 connected to one another may in this case be supported against an inner wall of the tube. For this purpose, the holding portion 5 in the exemplary embodiment shown in FIG. 1 and FIG. 2 has in alternation at the outer end of the holding portion 5 holding tongues 7 designed as a pull-out securing means 6 and stabilizing elements 8, wherein the stabilizing elements 8 and the holding tongues 7 end at the same distance from the axis 34. The bearing cup 1 is advantageously designed in such a manner that when the rolling bearing 10 is pressed into the bearing cup 1, the holding portion 5 is pressed with the holding tongues 7 and the stabilizing elements 8 further outwards in the direction of an inner wall of a tube.

In the exemplary embodiment shown in FIG. 1 and FIG. 2, two holding tongues 7 are always arranged alongside one another, then follows a stabilizing element 8, then once again two holding tongues 7 and another stabilizing element 8 etc., wherein the holding portion 5 comprises a total of eight stabilizing elements 8 arranged in a star shape and sixteen holding tongues 7. The number of holding tongues 7 and stabilizing elements 8 in this case may, in particular, vary depending on the size of the bearing cup 1. The stabilizing elements 8 are oriented radially outwards and have supporting surfaces at their ends, with which the bearing cup 1 can rest against the inner wall of a tube, wherein the stabilizing elements 8 are designed to receive forces which act via a tube on the bearing cup, in particular, when the bearing cup 1 is introduced into the tube. The forces caused by the stabilizing elements 8 do not act on the rolling bearing 10, or at least only to a substantially lesser degree.

In the exemplary embodiment shown in FIG. 1 and FIG. 2, the holding tongues 7 and the stabilizing elements 8 are tilted against a fitting direction 30, in which the rolling bearing 10 is fitted into the bearing cup 1, in particular through a curvature of the holding tongues 7 and the stabilizing elements 8. The holding tongues 7 are to a certain extent designed to be elastically yielding. If a force is applied to a bearing cup 1 introduced into a tube against the fitting direction 30, the holding tongues 7 act like barbed hooks and prevent said bearing cup 1 from being moved in this direction. Since the holding tongues 7 in this case tend to be further straightened, this locking action increases.

Figure 3:
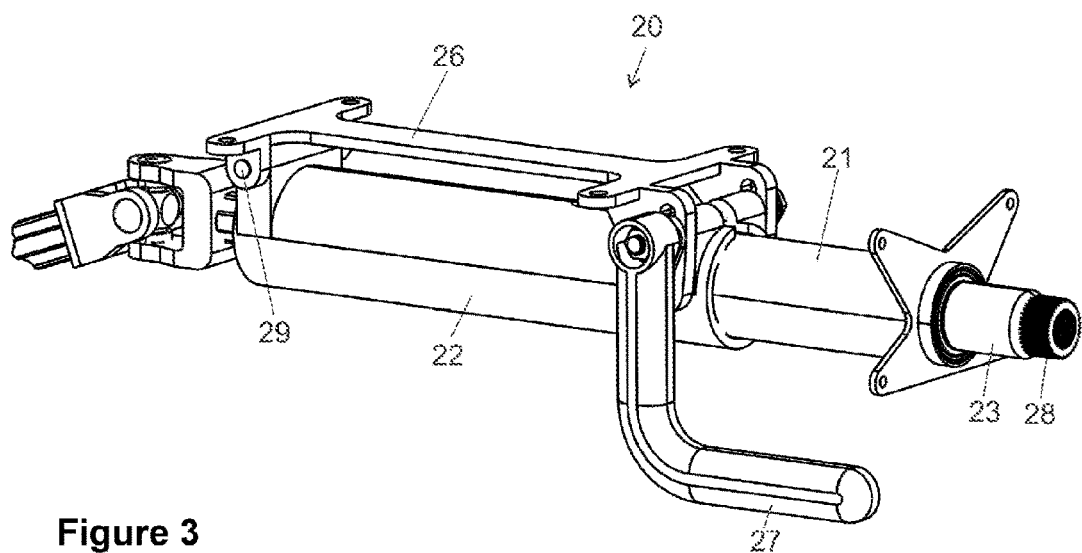
FIG. 3 is a perspective view of a steering column designed according to the invention.
Figure 4:
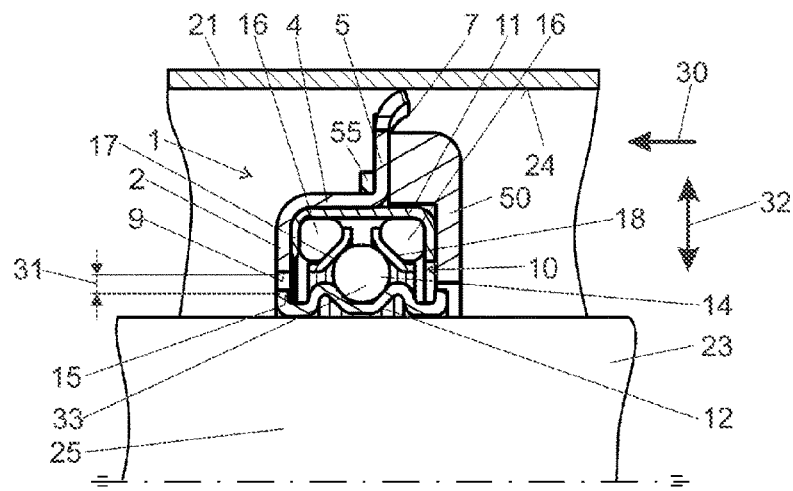
FIG. 4 is a sectional view of detail from the steering column according to FIG. 3.

With reference to FIG. 3 to FIG. 5, an exemplary for a steering column 20 designed according to the invention is explained in greater detail below. In this exemplary embodiment, the steering column 20 is a steering column designed to be manually adjustable. In particular, however, it may also be provided that the steering column has an electrically adjustable design or also a nonadjustable design.

The steering column 20 shown in FIG. 3 comprises a first jacket tube 21 and a second jacket tube 22, wherein the first jacket tube 21 can be inserted telescopically into the second jacket tube 22 or extended from the second jacket tube 22, in order to adjust the length of the steering column 20. For this purpose, the fixing lever 27 of the steering column 20 must be released. The second jacket tube 22 is, moreover, arranged over a hinge 29 and, in the region of the fixing lever hinge, on a carrier unit 26, with which the steering column 20 can be arranged on a body part of a motor vehicle. When the fixing lever 27 is released, the steering column 20 may, in addition, be height-adjusted due to the elongate hole partially concealed by the fixing lever 27 in FIG. 3.

The steering column 20 further comprises a steering shaft 23. The steering shaft 23 in this case is arranged so as to be rotatable within the first jacket tube 21 and the second jacket tube 22, wherein at the end 28 of the steering shaft 23 a steering handling device, in particular a steering wheel, may be arranged. The steering shaft 23 in this case is supported by a rolling bearing 10, wherein the rolling bearing 10 is arranged in a bearing cup 1 and is secured by a securing element 50 connected to the bearing cup 1, to prevent it from falling out or being displaced in relation to the bearing cup 1. The bearing cup 1 with the rolling bearing 10 and the securing element 50 is inserted into the first jacket tube 21 in this case. The arrangement of the bearing cup 1 with the rolling bearing 10 inserted into the bearing cup 1 and the securing element 50 connected to the bearing cup 1 in the first jacket tube 21 is shown in detail in the sectional depiction in FIG. 4 in this case. Moreover, FIG. 5 shows the rolling bearing 10 surrounded by the connected bearing cup set 100 in a further representation without the steering shaft 23 and without the first jacket tube 21.

The rolling bearing 10 in this exemplary embodiment comprises an inner ring 12, a plurality of rolling bodies 14, a first outer ring 17 and a second outer ring 18. The outer rings 17, 18 in this case are held by a shock-absorbing element 16 which is supported against a sleeve-shaped outer element 11. The shock-absorbing element 16 in this exemplary embodiment is formed by two rubber rings. The shock-absorbing element 16 in this case allows a damping movement 33 of the inner ring 12 relative to the outer element 11 in a radial direction 32 up to a maximum damping path. As a result of this, forces which are exerted on the guide shaft 23 in the radial direction are dampened. The inner ring 12 of the rolling bearing 10 projects laterally beyond the outer element 11 with an inner ring portion 15. The rolling bearing 10 is pressed into the bearing cup 1.

The bearing cup 1 comprises a wall portion 4 and a base portion 2 adjacent thereto with an opening 3 and a collar 9 delimiting the opening 3, wherein the steering shaft 23 is fed through the opening 3. The base portion 2 partially covers the side 13 with which the rolling bearing 10 is introduced into the bearing cup 1. The wall portion 4 of the bearing cup 1 partially encloses the outer element 11 of the rolling bearing 10 which is received and thereby fixes the outer element 11 of the rolling bearing 10 relative to the first jacket tube 21. A holding portion 5 of the bearing cup 1 adjoining the wall portion 4, which bearing cup extends radially outwards from the wall portion 4, is supported against the inner wall 24 of the first jacket tube 21. At the outer end of the holding portion 5, said holding portion 5 has stabilizing elements 8 and holding tongues 7 as a means of preventing it from being pulled out. The holding portion 5 with the stabilizing elements 8 and the holding tongues 7 may, in particular, be designed as is explained with reference to FIG. 1 and FIG. 2. The holding tongues 7 in this case secure the bearing cup 1 to prevent movement against the fitting direction 30. Using a securing element 50 which is fixedly connected to the bearing cup 1 by joining, in particular as explained with reference to the exemplary embodiment according to FIG. 1 and FIG. 2, the rolling bearing 10 is also fixed against the bearing cup 1 in the axial direction. The bearing cup set 100 thereby secures the rolling bearing 10 to prevent it from accidentally falling out or shifting its position.

In addition, the bearing cup 1 of the bearing cup set 100 and the rolling bearing 10 are adapted to one another in such a manner that the collar 9 and the inner ring portion 15, which is bent towards the collar 9, are facing one another. The collar 9 in this case forms a shoulder and the inner ring portion 15 forms a counter-shoulder, which lie opposite one another at a distance 31. This distance 31 is smaller than the maximum damping path technically prescribed by the rolling bearing 10 in this case. In particular, the distance 31 is smaller than the vertical distance starting from the midpoint of one of the rolling bodies 14 to the inner diameter of a shock-absorbing element 16.

In a variant which is not depicted, it may also be provided that the inner ring 12 of the rolling bearing 10 does not project laterally beyond the outer element 11 and, instead of this, a steering shaft portion 25 forms the counter-shoulder which is arranged at a distance 31 from the collar 9.

If a force is now exerted on the steering shaft 23, so that the inner ring 12 of the rolling bearing moves in a radial direction 32 relative to the outer element 11 of the rolling bearing 10 in a damping movement, this damping movement is not technically restricted by the rolling bearing 10, but by the shoulder formed by the collar 9 and the counter-shoulder formed by the inner ring portion 15 encountering one another. In this way, a deflection of the steering shaft 23 is also restricted. In this case, the securing element 50 connected to the bearing cup 1 also prevents the rolling bearing 10 from leaving the receiving region of the bearing cup 1 completely or partially when there are forces acting on it.

Restricting the deflection of the steering shaft 23 is particularly advantageous as a means of protecting the steering shaft 23 fixed using a steering wheel lock. In the case of motor vehicles, a steering wheel lock is used as a means of securing to prevent unauthorized starting of the motor vehicle. In order to circumvent this securing means, attempts are sometimes made to overcome the steering wheel lock by applying high torque to the steering wheel 23.

In this case, a steering column 20 explained with reference to FIG. 3 to FIG. 5 is suitable for a method for preventing damage to the steering shaft 23 and for a method for preventing the steering wheel lock from being overcome. Depending on the embodiment of the steering wheel lock, it may be provided in this case that the method it designed to prevent a locking bolt from jumping over out of a locking bolt receiving groove of a steering shaft 23 bolted to a steering wheel lock or to prevent a latching star wheel mounted on a steering shaft 23 bolted using a steering wheel lock from jumping over when a torque is applied to the steering shaft 23. The steering shaft 23 in this case, in particular as described with reference to the exemplary embodiment shown in FIG. 3 to FIG. 5, is mounted in a rolling bearing 10 with an inner ring 12 and an outer element 11, wherein the rolling bearing 10 is arranged in a jacket tube 21 in a bearing cup set 100 in which a securing element 50 is fixedly connected to the bearing cup 1. In the method, the outer element 11 is fixed relative to the jacket tube 21 by the bearing cup 1. The steering shaft 23 displaces the inner ring 12 radially relative to the outer element 11 due to the torque applied. This displacement is restricted in this case by the fact that the shoulder formed by the collar 9 of the bearing cup 1 is in contact with a counter-shoulder formed by a contact surface 15, 25 opposite the shoulder. This contact means that a further displacement of the inner ring 12 relative to the outer ring 12 is prevented, and therefore also a further deflection of the steering shaft 23, and therefore also that the steering shaft 23 is deflected so far that the locking bolt can jump out of a locking bolt receiving groove or that a locking bolt jumps over a point of a latching star wheel.

Figure 6:
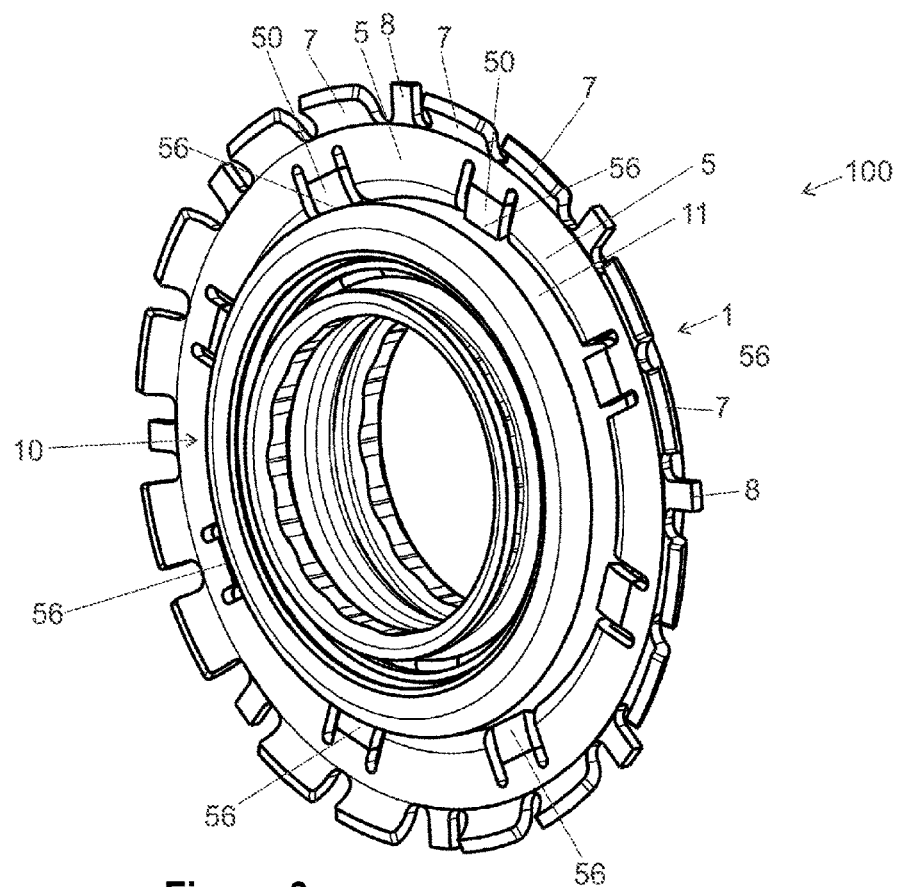
FIG. 6 is a perspective view of a further exemplary embodiment of a bearing cup set designed according to the invention and a rolling bearing.
Figure 7:
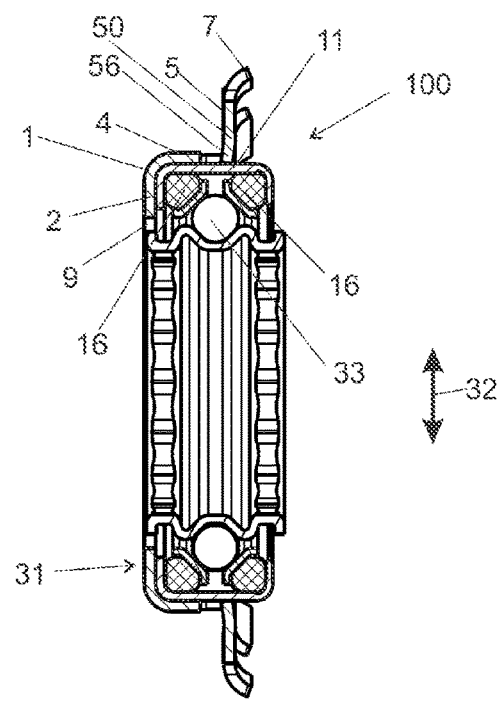
FIG. 7 is a sectional view of a bearing cup set designed according to the invention with the bearing cup and securing element connected as an integral, one-piece embodiment and the rolling bearing pressed in according to the exemplary embodiment in FIG. 6.

A perspective representation of a further exemplary embodiment of a bearing cup set 100 designed according to the invention and a rolling bearing 10 is represented in FIG. 6. FIG. 7 shows in a sectional representation the exemplary embodiment in FIG. 6 for a bearing cup set 100 designed according to the invention with the bearing cup 1 connected and a securing element 50 as an integral, one-piece embodiment and also a pressed-in rolling bearing 10.

In the exemplary embodiment shown in FIG. 6 and FIG. 7, two holding tongues 7 are always arranged side by side, then there follows a stabilizing element 8, then again two holding tongues 7 and another stabilizing element 8, etc. The number of holding tongues 7 and the stabilizing elements 8 in this case may, in particular, vary depending on the size of the bearing cup 1. The stabilizing elements 8 are directed radially outwards and have supporting surfaces at their ends, with which the bearing cup 1 can be supported against the inner wall of a tube, wherein the stabilizing elements 8 are designed for receiving forces which particularly act via a tube on the bearing cup, when the bearing cup 1 is introduced into the tube. The forces caused by the stabilizing elements 8 do not act on the rolling bearing 10, or at least only to a substantially lesser degree. All aspects in relation to the holding tongues 7 and the stabilizing elements 8 of the other exemplary embodiments can be transferred to the exemplary embodiment in FIG. 6 and FIG. 7.

The bearing cup 1 and the securing elements 50 designed as the holding tongue 56 are designed as a one-piece, integral component in this exemplary embodiment, which is formed from a metal material as a stamped and formed component. The securing elements 50, which each comprise a holding tongue 56 which projects inwardly substantially in the radial direction 32, are formed in the holding portion 5. A securing element 50 may also comprise more than one holding tongue 56. The securing elements 50 or the holding tongues 56 are arranged evenly distributed over the periphery.

The holding tongues 56 form the securing means preventing removal for the rolling bearing 10, so that once it has been pressed in, said roller bearing cannot be removed from the bearing cup 1 again without a greater expenditure of force. The holding tongues 56 have a flexible design and are tilted against the fitting direction, wherein the maximum described diameter which is formed by the holding tongues 56 before the pressing-in is smaller than the outer diameter of the outer element 11 of the rolling bearing 10. As a result of this, the holding tongues 56 are wedged into the rolling bearing 10 inserted in the bearing cup 1 with the outer lateral surface of the outer ring 11 of the rolling bearing 10, when the rolling bearing 10 is exposed to a force against the fitting direction in the bearing cup 1. As a result of this, a fixed and reliable fit of the rolling bearing 10 in a bearing cup 1 is achieved.

The exemplary embodiments depicted in the figures and explained in conjunction with these are used to explain the invention and do not serve to limit it.

LIST OF REFERENCE SIGNS 1 bearing cup
2 base portion
3 opening
4 wall portion
5 holding portion
6 pull-out securing means
7 holding tongue
8 stabilizing element
9 collar (shoulder)
10 rolling bearing
11 outer element (outer ring)
12 inner ring (counter-shoulder)
13 side of the rolling bearing (10)
14 rolling body
15 inner ring portion
16 shock-absorbing element
17 first outer ring
18 second outer ring
20 steering column
21 first jacket tube
22 second jacket tube
23 steering shaft
24 inner wall of the first jacket tube (21)

25 steering shaft portion
26 carrier unit
27 fixing lever
28 end of the steering shaft (23) for receiving a steering handling device
29 hinge
30 fitting direction
31 distance
32 radial direction
33 damping movement
34 axial direction
40 bearing cup portion
41 first opening side
42 second opening side
45 form-fitting recess
50 securing element
51 connection portion
52 receiving portion
53 base portion
54 wall portion
55 form-fitting element
56 holding tongue
59 collar
100 bearing cup set
L longitudinal axis

What is claimed is:

1. A bearing cup set for a steering column comprising:
a bearing cup and a securing element, wherein the bearing cup has a bearing cup portion for at least partially receiving a rolling bearing and a holding portion extending radially outwards starting from the bearing cup portion, wherein the bearing cup portion has a first opening side with a collar extending radially inwards and a second opening side, and wherein the securing element is connected to the bearing cup in such a manner that the securing element fixes the rolling bearing received by the bearing cup portion in the axial direction with respect to the bearing cup,
wherein the bearing cup set has a connection that connects the securing element to the bearing cup at the second opening side of the bearing cup portion,
wherein the bearing cup has form-fitting elements and the securing element has form-fitting recesses, wherein the form-fitting elements engage with the form-fitting recesses to form the connection of the bearing cup set when the securing element is connected to the bearing cup.

2. The bearing cup set according to claim 1, wherein the form-fitting elements are designed as latching lugs and the form-fitting recesses are designed as receiving slots for the latching lugs.

3. The bearing cup set according to claim 1, wherein the holding portion comprises the form-fitting elements.

4. The bearing cup set according to claim 1, wherein the securing element has a connection portion, wherein the connection portion has the form-fitting recesses.

5. The bearing cup set according to claim 4 wherein the securing element has a receiving portion for the partial receiving of the rolling bearing, in such a manner that the rolling bearing received by the bearing cup set is completely received by the bearing cup and the securing element connected to the bearing cup and is fixed by the securing element in the axial direction with respect to the bearing cup.

6. The bearing cup set according to claim 1, wherein the bearing cup is a one-piece, integral component.

7. The bearing cup set according to claim 1, wherein the bearing cup is made of a metal material.

8. The bearing cup set according to claim 1, wherein the securing element is made of plastic.

9. The bearing cup set according to claim 1, wherein the bearing cup comprises a shoulder that creates a distance from a predefined counter-shoulder, which is formed by one of a steering shaft and an inner ring of the rolling bearing to limit a deflection of the steering shaft.

10. A steering column comprising:
a jacket tube, in which a steering shaft is received in a rotatably mounted manner by a rolling bearing, wherein the rolling bearing is arranged in a bearing cup portion of a bearing cup and the bearing cup is supported with a holding portion against an inner wall of the jacket tube; and
a securing element connected to the bearing cup such that the rolling bearing is fixed in the axial direction with respect to the bearing cup.

11. The steering column according to claim 10, wherein the bearing cup and the securing element comprise a bearing cup set comprises the bearing cup and the securing element, wherein the bearing cup has a bearing cup portion for at least partially receiving the rolling bearing and the holding portion extending radially outwards starting from the bearing cup portion, wherein the bearing cup portion has a first opening side with a collar extending radially inwards and a second opening side, and wherein the bearing cup set has a connection that connects the securing element to the bearing cup at the second opening side of the bearing cup portion, wherein the bearing cup has form-fitting elements and the securing element has form-fitting recesses, wherein the form-fitting elements engage with the form-fitting recesses to form the connection of the bearing cup set when the securing element is connected to the bearing cup.

12. The steering column according to claim 10 wherein the bearing cup comprises a shoulder which is at a defined distance from a counter-shoulder which is formed by one of the steering shaft and an inner ring of the rolling bearing, wherein the shoulder is disposed at the defined distance to restrict a deflection of the steering shaft.

13. A bearing cup set for a steering column comprising:
a bearing cup and a securing element, wherein the bearing cup has a bearing cup portion for at least partially receiving a rolling bearing and a holding portion extending radially outwards starting from the bearing cup portion, wherein the bearing cup portion has a first opening side with a collar extending radially inwards and a second opening side, and wherein the securing element is connected to the bearing cup in such a manner that the securing element fixes the rolling bearing received by the bearing cup portion in the axial direction with respect to the bearing cup,
wherein the securing element and the bearing cup are a one-piece, integral component.

14. A bearing cup set for a steering column comprising:
a bearing cup and a securing element, wherein the bearing cup has a bearing cup portion for at least partially receiving a rolling bearing and a holding portion extending radially outwards starting from the bearing cup portion, wherein the bearing cup portion has a first opening side with a collar extending radially inwards and a second opening side, and wherein the securing element is connected to the bearing cup in such a manner that the securing element fixes the rolling bearing received by the bearing cup portion in the axial direction with respect to the bearing cup, wherein at least one of the holding portion and the securing element comprises at least one holding tongue.

* * * * *